UNITED STATES PATENT OFFICE.

CARL BOSCH, ALWIN MITTASCH, AND HANS WOLF, OF LUDWIGSHAFEN-ON-THE-RHINE, AND GEORG STERN, OF MANNHEIM, GERMANY, ASSIGNORS TO BADISCHE ANILIN & SODA FABRIK, OF LUDWIGSHAFEN-ON-THE-RHINE, GERMANY, A CORPORATION.

CATALYTIC AGENT FOR USE IN PRODUCING AMMONIA.

1,148,570.  Specification of Letters Patent.  Patented Aug. 3, 1915.

No Drawing.  Application filed December 24, 1910. Serial No. 599,101.

*To all whom it may concern:*

Be it known that we, CARL BOSCH, ALWIN MITTASCH, HANS WOLF, and GEORG STERN, doctors of philosophy and chemists, subjects the first and fourth of the King of Prussia, the second of the King of Saxony, and the third of the King of Bavaria, residing the first three at Ludwigshafen-on-the-Rhine, Germany, and the fourth at Mannheim, Germany, have invented new and useful Improvements in Catalytic Agents for Use in Producing Ammonia, of which the following is a specification.

Our invention relates to catalytic agents suitable for use in the manufacture of ammonia by synthesis from its elements.

It has long been known that small quantities of ammonia can be produced synthetically from its elements by passing them over a catalytic agent. Thus Fleck (*cf.* Bolley's *Handbuch der chemischen Technologie*, 1862, II, pp. 2, 48) stated that ammonia could be obtained by passing a mixture of nitrogen, carbon monoxid and steam over hot lime. Ramsay and Young (*Journal of the Chemical Society*, 1884, vol. 45, p. 93) stated that on passing a mixture of dry nitrogen and hydrogen over iron filings contained in a red hot glass tube they were unable to observe that any ammonia had been formed, while if moist gases were used ammonia, but only a trace, was formed. Perman, in the *Proceedings of the Royal Society* (vol. 76, p. 167, etc.), describes experiments made by passing nitrogen and hydrogen over iron and stated that no ammonia could be obtained in any case, unless the iron was at a bright red heat, and the largest yield he obtained consisted of one-fifth of a milligram from 250 c. cm. of mixed gases. Haber and van Oordt (*Zeitschrift für anorganische Chemie*, 44, p. 341) and Haber and Le Rossignol (*Berichte*, 40, p. 2146) experimented on the production of ammonia from nitrogen and hydrogen by passing them over iron-asbestos, and iron, nickel, chromium, and manganese, but the results obtained by them and also by Nernst and Jost (*Zeitschrift für anorganische Chemie*, 57, p. 414) led to the conclusion that a practical manufacture of ammonia synthetically from its elements by passing them over such a catalytic agent as the known forms of iron or the like was out of the question (see *Zeitschrift für Elektrochemie*, 1908, vol. 14, p. 181).

We have experimented with iron as a catalyst and have found that the known forms of iron including iron which is sold as "purest" or "guaranteed pure" yield results which are altogether impracticable for the manufacture of ammonia, and moreover the small yield which may be obtained does not remain constant, but usually diminishes more or less rapidly.

We have now discovered a new form of iron by the use of which as a catalyst the manufacture of ammonia is rendered possible. For instance, with our new iron we obtain from a mixture of nitrogen and hydrogen, in practical working, say as described in Example 16 a mixture of gases containing upward of eight per cent. by volume of ammonia, and this yield remains practically constant, for instance when the iron has been in use for at least several weeks.

Our invention, however, is not restricted to such iron as constantly gives at least eight per cent. by volume of ammonia under the conditions referred to, since iron can be produced according to our invention which gives smaller yields than eight per cent., which may also diminish somewhat in use, but which is sufficiently active to enable the production of ammonia on a commercial scale to be carried out.

By our invention we are therefore enabled to obtain ammonia in such quantities that a commercially successful production thereof can be carried out, and thus this most important compound can be produced while making use of free nitrogen obtained from the air.

We have discovered that certain bodies when suitably mixed or compounded with iron impart to it the property of enabling the combination of nitrogen and hydrogen to take place to a higher degree than in the absence of such bodies. We have also further discovered that certain bodies appear to act as poisons on the catalytic property of iron, so that when such a body is present with the iron, any property which it would otherwise possess of bringing about the combination of hydrogen and nitrogen is diminished or entirely destroyed. Among the bodies which act as poisons in the manner above described, we mention arsenic, sulfur, selenium, tellurium, phosphorus, boron, antimony, bismuth, lead, tin, and zinc and their compounds. As a rule the elements hereinbefore mentioned exercise their deleterious effect whether the said element be added or be present as such or in the form of a suitable compound thereof. Carbon monoxid and some other carbon compounds are also poisonous. On the other hand, the catalytic power of iron to convert hydrogen and nitrogen into ammonia is enhanced by the presence of compounds of such elements as magnesium, beryllium, aluminium, the rare earth metals such as cerium, lanthanum, erbium, neodymium, praseodymium, samarium, yttrium, ytterbium, and further potassium, rubidium, cæsium, sodium, lithium, strontium, barium, calcium, uranium, thorium, zirconium, vanadium, niobium, tantalum, chromium, manganese, molybdenum, and tungsten. These bodies may be termed "promoters." For instance, mangesium may be added to the iron in the form of magnesium nitrate, and since it is evident that during the passage of the mixture of hydrogen and nitrogen over the contact material, the body added may undergo some chemical change, we do not wish to be understood as confining our invention to the use or otherwise of the specific compounds of the elements mentioned. The presence of very small quantities of the aforesaid bodies may be sufficient to exert a very deleterious effect, or on the other hand a very favorable effect, on the catalytic power of the iron. For instance, such small quantities of the contact-poisons as occur sometimes in iron sold as "pure" or "purest" may exert a very deleterious action, while on the other hand the presence of 0.2 per cent. of aluminium oxid may be sufficient to increase very considerably the yield of ammonia obtained. To some extent the deleterious action of a contact poison may be counteracted by the addition of a body which has the power of promoting the catalytic action. Thus iron containing a small proportion of sulfur has little or no catalytic action on a mixture of hydrogen and nitrogen, but if such iron containing a small proportion of sulfur be suitably treated with sufficient magnesia, the poisonous action of the sulfur may be overcome, and the resulting mixture may possess such a catalytic power that it may be employed in the manufacture of ammonia. The presence of a promoter in the iron is also of advantage in those cases where, without its presence, the power of the catalytic agent to produce ammonia diminishes as time goes on.

The body can be added to the iron in any suitable manner, for instance a metallic oxid, hydroxid, or salt, or other suitable compound, can be added to the iron which is otherwise ready for use as the catalytic agent, or it can be added to the materials from which the catalytic agent is to be prepared. Naturally occurring iron oxid, or iron hydroxid, which contains a suitable promoter according to this invention can be employed for the production of the catalytic agent. Thus for instance, iron oxid may be moistened with a solution containing caustic potash and then filled into the reaction tube in which it is then reduced to the metallic form by the hydrogen passing over it, or iron may be mixed with, for instance, magnesia, and the mixture may be dissolved in nitric acid, the solution obtained then being evaporated to dryness and the mixture of nitrates calcined. On filling the resulting mixture into the contact tube and passing through it the mixture of hydrogen and nitrogen, the iron oxid is reduced and a catalytic agent is obtained which gives satisfactory yields of ammonia.

Again, iron which is otherwise unsuitable for use as a catalytic agent, either owing to its content of contact poison or for some other reason, can be rendered efficient as a catalytic agent for the production of ammonia by heating it, either as such or, preferably, in admixture with a promoter, to a high temperature, either in the presence of air or oxygen or other suitable compound, so that the iron and also the admixture, if such has been added, are converted, at any rate for the greater part, into the oxids thereof and the resulting product is reduced again with hydrogen free from contact poison. The heating should preferably be carried out so that the mixture melts and may also be carried out *in vacuo* or in the presence of indifferent gases, provided that the conditions are such that a mixture of oxids is obtained. The resulting mixture of oxid, after having been broken up if necessary, can either be placed in the contact tube or furnace, or it can be previously reduced, for instance with hydrogen. If such treatment be applied to iron containing a contact poison, it appears to bring about the result that the iron is purified therefrom, either by the said contact poisons being entirely removed or converted into an innocuous condition, and the iron is then capable of yielding satisfactory quantities of ammonia. If one treatment does not produce the desired result, it must be repeated.

Of course instead of employing iron in the form of metal, those compounds thereof such as oxids, hydroxids, nitrids, and salts, can be employed, which under the conditions of working are converted into the metal.

For the continued activity of the contact material, the gases should be free from bodies which act as contact poisons before they are passed over the catalytic agent. In particular they should not contain carbon monoxid, or carbon dioxid, or sulfur, or a compound thereof. They should also be free from oil.

It may be that our treatment of practically inert iron to convert it into the new form which can be used in the commerical manufacture of ammonia, removes, destroys, or otherwise renders inert traces or small quantities of contact poisons in the iron, or it may introduce or render active traces or small quantities of promoters similarly present, or both these results may simultaneously occur. Or the result of the treatment may be a physical change, either alone or in addition to both or either of the above actions. We do not, however, bind ourselves to any theoretical explanation of the effect produced. In the form preferred for carrying out the invention, we prefer to treat a very pure iron in the presence of a promoter and to use the iron so obtained in the presence of the said promoter in the manufacture of ammonia.

When our new form of iron is produced by the reduction of iron oxid, or other compound of iron, either with or without the addition of a promoter or the like, we prefer to reduce the said oxid at as low a temperature as possible, since when our new form of iron which is capable of bringing about the combination of nitrogen and hydrogen to the degree necessary for commercial operations, is subjected to a high temperature, say eight hundred or nine hundred degrees centigrade, it tends to lose its catalytic power to a greater or lesser extent. We prefer also, therefore, to employ as low a temperature as practicable for the production of ammonia, and it is a characteristic property of our new form of iron that it enables the production of ammonia to be carried out catalytically on a commercial scale at such a temperature that its catalytic action remains substantially constant.

The production of ammonia can be carried out under either ordinary or increased pressure.

Our new form of iron as hereinbefore described can, if desired, be employed for the purpose of producing ammonia when it is situated on a carrier, such for instance, as asbestos and chamotte. A carrier may be employed such that a constituent thereof constitutes a promoter in the sense hereinbefore defined, and this promoter may enter the iron and enhance its catalytic power. Or the iron may be brought into the favorable form for the production of ammonia by applying both the iron and the promoter, to the carrier. If desired, these two methods of procedure may be combined.

The following examples will serve to illustrate further the nature of our invention, but we do not wish to be understood as restricting our invention in any way to these examples.

Example 1: Melt iron such as is sold as pure, but which contains traces of impurities, in a current of oxygen, so that molten iron oxid is formed. Allow to cool and then break up the mass into small pieces and reduce it with hydrogen at as low a temperature as possible. It will be found to give a much better yield of ammonia than did the iron before such treatment. Repeat the treatment till no substantial further improvement results. The oxygen and hydrogen used must be free from contact poisons.

Example 2: Take ordinary commercial iron oxid which is devoid of any catalytic action as regards the production of ammonia, mix it with five per cent. of potassium carbonate and treat the mixture in a current of air free from contact poison at a temperature of twelve hundred degrees centigrade, for several hours, and then reduce in a current of hydrogen free from contact poison. The product obtained possesses a good catalytic action.

Example 3: Subject magnetite which contains a small proportion of pyrites to oxidation and reduction and repeat the process several times. The final product will be found to constitute an efficient catalytic agent for the synthetic production of ammonia. The oxygen and hydrogen used for the oxidation and reduction must be free from contact poisons.

Example 4: Moisten iron oxid with from three, to four, per cent. of its weight of caustic potash dissolved in a small quantity of water. Place the mixture in the contact tube or furnace and then reduce it with hydrogen free from contact poison.

In this example, instead of caustic potash, other hydroxid, salt, or other suitable compound, can be employed, for instance, sodium carbonate, saltpeter, magnesium chlorid, or strontium nitrate.

Example 5: Mix iron with one-tenth of its weight of magnesia, dissolve the mixture in pure nitric acid, evaporate the solution to dryness and convert the nitrates into the oxids by means of heat. Then reduce the mixture with hydrogen free from contact poison.

In this example, instead of magnesia. oxids and nitrates of aluminium, beryllium, or other rare earth, can be substituted.

Example 6: Dissolve together equal parts by weight of iron nitrate and aluminium nitrate in water. Precipitate the hydroxids by means of pure ammonia and then filter, calcine, and reduce at as low a temperature as possible the mixture of oxids obtained with hydrogen free from contact poison.

Example 7: Moisten iron oxid, which from its preparation already contains a suitable admixture, such for instance as the *Crocus martis* of commerce (Dammer, *Handbuch der chemischen Technologie*, vol. 4, p. 541), and press it into the form of rods, place it in the contact tube or furnace and reduce it, either with hydrogen free from contact poison, or with ammonia, or with the mixture of hydrogen and nitrogen which is to be used for the manufacture of ammonia.

Example 8: Soak iron oxid in a solution of zirconium nitrate and then dry, and reduce the product in a current of hydrogen free from contact poison.

Example 9: Break magnetite, or hematite, free from arsenic and sulfur, into a coarse powder and reduce it with hydrogen free from contact poison. The product so obtained contains substances other than iron and produces much higher yields of ammonia when used as a catalytic agent than does a pure iron catalytic agent prepared from pure $Fe_3O_4$, or $Fe_2O_3$.

Example 10: Mix together a solution of iron nitrate with ammonium molybdate, so that about equal parts by weight of iron and of molybdenum are employed; evaporate the mixture and heat it until the oxids are produced, and then reduce the mixture with hydrogen free from contact poison.

In this example, ammonium vanadate, or ammonium tungstate, can be substituted for the ammonium molybdate.

Example 11: Melt a pure iron with about two per cent. of pure aluminium oxid in a current of oxygen at a strong white heat. The product can be broken and employed as the catalytic agent after having been reduced at as low a temperature as possible, either outside or inside the contact tube or furnace. The oxygen and hydrogen used must be free from contact poisons.

Example 12: Heat iron oxid with about three per cent. by weight of potassium carbonate to a temperature of one thousand degrees centigrade, and break into small pieces the mass obtained and reduce it with hydrogen free from contact poison.

Example 13: Mix iron with two per cent. by weight of magneisum, two per cent. by weight of lime, and one per cent. by weight of silica, then add two and a half times by weight the quantity of potassium perchlorate, apply a light to the mixture and break up the oxidized mass obtained, and then reduce it with hydrogen free from contact poison.

Example 14: Soak purified asbestos with a solution containing iron nitrate and aluminium nitrate, then dry, and reduce in a current of hydrogen which is free from contact poison.

Example 15: Heat porous grains of clay for some time with a solution of iron nitrate, dry the whole, and then fill it into the contact tube. Then reduce in a current of hydrogen free from contact poison. If desired, the reduction may be carried out before the mixture is introduced into the contact tube. The constituents of the clay which have gone into solution help to increase the catalytic activity of the iron.

Instead of clay, another carrier which behaves in a similar manner may be employed.

Example 16: In order to obtain ammonia, pass a current of gas containing three volumes of hydrogen and one volume of nitrogen through a contact tube containing a contact material which has been prepared according to the foregoing example 11, while maintaining a temperature of between four hundred and fifty and five hundred and fifty degrees centigrade, and at a pressure of two hundred atmospheres.

Example 17: Melt a pure iron with five per cent. of pure aluminium in a current of pure oxygen and reduce the iron oxid by means of pure hydrogen. Then pass a current of nitrogen and hydrogen in combining proportions over the resulting mixture at a temperature of from four hundred to five hundred degrees centigrade at atmospheric pressure.

Example 18: Place as pure an iron oxid as possible in a contact tube and pass a current of pure hydrogen and nitrogen through it while maintaining a temperature below six hundred degrees centigrade, and then, when the oxid is reduced, continue passing the mixture of pure hydrogen and nitrogen in combining proportions, never allowing the temperature of the contact mass to rise above six hundred degrees centigrade, and maintaining a pressure of one hundred and fifty atmospheres.

We do not claim in this present application generically the production of ammonia while making use of a catalytic agent together with a promoter in each case, such production and such catalytic mixtures being embodied in the claims of Patent No. 1,094,194, neither do we claim in this application the production of ammonia while making use of the catalysts of the present invention, since such manufacture of ammonia is claimed in our divisional application Serial No. 869,147 filed Oct. 28, 1914.

Now what we claim is:—

1. A new form of iron which is an active catalytic agent for the manufacture of ammonia from its elements.

2. A new form of iron which is an active catalytic agent for the manufacture of ammonia from its elements and retains its catalytic power while in use in the absence of contact poison so as to be applicable to the manufacture of ammonia from its elements for several weeks.

3. An active catalyst for the manufacture of ammonia from its elements consisting of iron and a promoter substantially as described.

4. An active catalyst for the manufacture of ammonia from its elements consisting of iron and aluminium oxid.

5. An active catalyst for the manufacture of ammonia from its elements consisting of ninety-eight per cent. of iron and two per cent. of aluminium oxid.

6. The process for the manufacture of a new form of iron which is an active catalyst for the manufacture of ammonia from its elements, by oxidizing iron in the presence of oxygen free from contact poisons and reducing the iron oxid obtained with hydrogen free from contact poisons and repeating the treatment if necessary.

7. The process of manufacturing an active catalyst for the manufacture of ammonia from its elements, consisting in heating a mixture of iron and a promoter in a current of oxygen free from contact poison and then treating the product with hydrogen free from contact poison substantially as described.

In testimony whereof we have hereunto set our hands in the presence of two subscribing witnesses.

CARL BOSCH.
ALWIN MITTASCH.
HANS WOLF.
GEORG STERN.

Witnesses:
ERNST F. EHRHARDT,
J. ALEX. LLOYD.

It is hereby certified that in Letters Patent No. 1,148,570, granted August 3, 1915, upon the application of Carl Bosch, Alwin Mittasch, and Hans Wolf, of Ludwigshafen-on-the-Rhine, and Georg Stern, of Mannheim, Germany, for an improvement in "Catalytic Agents for Use in Producing Ammonia," errors appear in the printed specification requiring correction as follows: Page 2, line 23, for the word "mangesium" read *magnesium;* page 4, line 50, for the word "magneisum" read *magnesium;* and that the said Letters Patent should be read with these corrections therein that the same may conform to the record of the case in the Patent Office.

Signed and sealed this 2nd day of November, A. D., 1915.

[SEAL.]

R. F. WHITEHEAD,
*Acting Commissioner of Patents.*